(12) United States Patent
Kolb et al.

(10) Patent No.: US 7,830,547 B2
(45) Date of Patent: Nov. 9, 2010

(54) USER INTERFACE ASSISTANT

(75) Inventors: Kurt Kolb, Welwyn Garden (GB); Themba Muchaneta, Loughborough (GB)

(73) Assignee: Xerox Corporation, Norwalk, CT (US)

( * ) Notice: Subject to any disclaimer, the term of this patent is extended or adjusted under 35 U.S.C. 154(b) by 1228 days.

(21) Appl. No.: 11/290,120

(22) Filed: Nov. 30, 2005

(65) Prior Publication Data

US 2007/0168758 A1   Jul. 19, 2007

(51) Int. Cl.
*G06F 15/00* (2006.01)
(52) U.S. Cl. .................. 358/1.9; 358/1.14; 358/406; 358/437
(58) Field of Classification Search ............... 358/1.14, 358/406, 437, 504, 1.1, 1.9
See application file for complete search history.

(56) References Cited

U.S. PATENT DOCUMENTS

| | | | |
|---|---|---|---|
| 4,413,314 A | 11/1983 | Slater et al. | |
| 4,570,217 A | 2/1986 | Allen et al. | |
| 4,713,775 A | 12/1987 | Scott et al. | |
| 5,239,547 A * | 8/1993 | Tomiyama et al. | 714/26 |
| 5,539,869 A | 7/1996 | Spoto et al. | |
| 5,862,054 A | 1/1999 | Li | |
| 5,862,322 A | 1/1999 | Anglin et al. | |
| 5,870,464 A | 2/1999 | Brewster et al. | |
| 6,327,579 B1 | 12/2001 | Crawford | |
| 6,574,615 B1 | 6/2003 | Huber et al. | |
| 6,599,241 B1 | 7/2003 | Murphy | |
| 6,684,242 B1 | 1/2004 | Bahlmann | |
| 6,687,749 B1 | 2/2004 | Chavez et al. | |
| 6,697,894 B1 | 2/2004 | Mitchell et al. | |
| 6,782,495 B2 * | 8/2004 | Bernklau-Halvor | 714/44 |
| 6,947,161 B2 * | 9/2005 | Suyehira | 358/1.15 |
| 2001/0007138 A1 * | 7/2001 | Iida et al. | 714/25 |

* cited by examiner

*Primary Examiner*—Thomas D Lee
(74) *Attorney, Agent, or Firm*—Fay Sharpe LLP (57) ABSTRACT

A diagnostic system provides help to a user utilizing a data store that stores one or more solutions to at least one error. A storage component logs error data and associates errors, responses to the errors, and information indicative of whether each of the error responses was successful or unsuccessful. A linking component receives the error data from a source and identifies an appropriate solution to the error data from the information logged in the storage component. A presentation component presents the appropriate solution to a user.

18 Claims, 6 Drawing Sheets

USER INTERFACE ASSISTANT

BACKGROUND

The following relates to user interfaces. It finds particular application to a user interface that assists a user with remedying one or more faults.

Help screens have long been employed to provide direction to a user in the event an error occurs with the operation of a particular device. Conventionally, in order to provide the proper guidance to a user, the device employs rudimentary techniques to identify the nature of the error. In one example, the error is detected when a contact switch, proximity sensor, etc. is activated. Since the location of the switch is known, the corresponding location of the error can be detected. Typically, a control system will utilize the input from the switch, proximity sensor, etc. and provide one or more instructions to the user to remedy the error condition.

Once the error code is identified, information employed to remedy the error can be located and presented to a user. In one example, the error condition is a paper jam in one location of a printing platform. An error code associated with this condition is identified by the machine control system. In response the machine can instruct the user to open one or more doors to search for the paper located somewhere within the machine. Such information can be inadequate since the instructions may not be clear, up-to-date or provide accurate information to a user. In another example, the help information is incorrect because of the limited number of error codes that inadequately represent all error conditions. Thus, the user is provided with an inappropriate remedy for the error condition. In yet another example, an error code does not exist for a particular error condition. In this case, a machine can be disabled without any information provided to the user.

Thus, systems and methods are needed to provide a user with pertinent information to resolve one or more error conditions.

BRIEF DESCRIPTION

In one aspect, a diagnostic system provides help to a user utilizing a data store that stores one or more solutions to at least one error. A storage component logs error data and associates errors, responses to the errors, and information indicative of whether each of the error responses was successful or unsuccessful. A linking component receives the error data from a source and identifies an appropriate solution to the error data from the information logged in the storage component. A presentation component presents the appropriate solution to a user.

In another aspect, a method provides help to a user, wherein an error code is received. The error is determined from the error code. Previous responses to the error code and clearance strategies for the error are reviewed. The appropriate clearance strategy is determined and the clearance strategy is displayed to the user.

In yet another aspect, a method is employed that remedies a machine error condition. An error code is received from the machine, which is representative of an error condition. A first solution is determined to respond to the error code and the first solution is displayed to a user. A determination is made if the first solution resolved the error condition. A network is interfaced to locate a second solution if the error was not resolved utilizing the first solution. A determination is made if the second solution resolved the error condition. Additional solutions are requested from at least one resource until the error is resolved.

DETAILED DESCRIPTION

Figure 1:
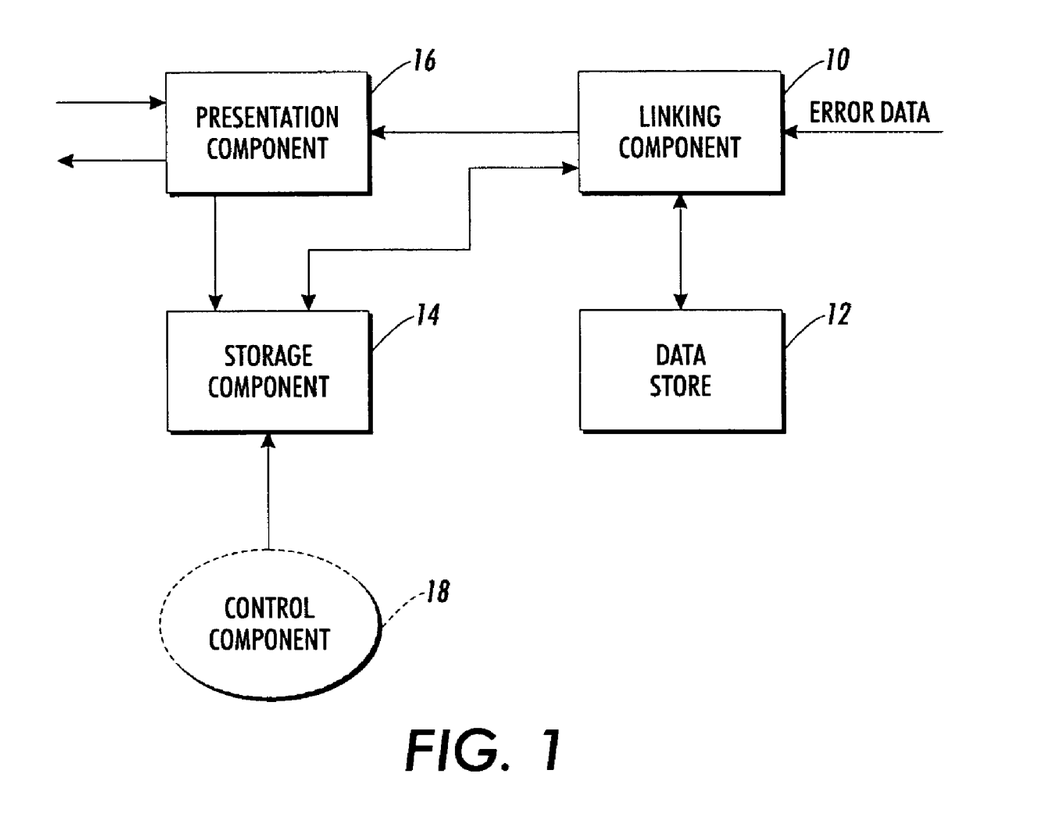
FIG. 1 illustrates a system that receives error data and provides a clearance strategy to a user.

With reference to FIG. 1, a diagnostic system that receives error data and provides a clearance strategy to a user is illustrated. The clearance strategy (e.g., help information) can be determined by information received from one or more sources and/or learning from historical information (e.g., past experiences). A linking component 10 determines the nature of the error based at least in part upon the error data received and determines the appropriate clearance strategy to address the error. The clearance strategy can be updated based at least in part upon information received from a data store 12 and/or a storage component 14. A presentation component 16 displays the clearance strategy from the linking component 10. A machine control component 18 can be employed by a user to respond to the clearance strategy displayed by the presentation component 16.

The linking component 10 receives error data that relate to a particular condition from one or more sources. Such error data can be generated by the one or more sources wherein a problem is recognized and error data correlating to such problem is generated. The linking component 10 receives the error data from one or more sources and determines the appropriate solution to address the error condition indicated by the error data. The linking component 10 can employ the data store 12 to correlate the error data to a solution.

In one example, a paper jam at a particular location within a machine is recognized when the paper jam activates a switch. The signal received from the switch can be associated with error data such as an error code, location data, paper media type, job information, batch information, etc. that signifies the nature of the error and allows such an error to be classified for further processing. Thus, the error data is indicative of a particular condition and can be presented in essentially any manner in virtually any format.

In one embodiment, a machine that employs this diagnostic system may provide a solution based on several errors occurring in concert or in series, as groups of errors maybe symptomatic of a particular problem. This solution may or may not be a solution of individual errors by themselves. For instance, a broad range of paper types and operations may lead to jams in several areas because of a faulty part upstream of one or more jam areas. The solution to replace the part would not be a solution of the individual fault codes.

The data store 12 can store one or more clearance strategies to at least one error condition. In one approach, a plurality of clearance strategies are associated with a particular error wherein success rates are employed to organize each solution based at least in part upon past and/or anticipated (or inferred)

ability to eliminate the error condition. Alternatively or additionally, a clearance strategy to an error can be updated in order to provide a best known clearance strategy to an error at any given point in time. Updating can occur from one or more external sources.

In one example, the data store 12 can be a searchable database wherein data can be stored, organized, edited and/or retrieved for subsequent use. One indicator, such as an error code, can be associated with (e.g., mapped to) one or more error conditions. In another example, additional information such as the location of the error, severity of the error, etc. can be associated with one or more error conditions. In this manner, extensive information can be gleaned from the error data received. In addition, clearance strategies to the one or more error conditions associated with the error data can be provided.

The storage component 14 can log error data, error response data and/or whether the error response was successful or unsuccessful. Error data can be indicative of the nature of one or more error conditions. Error data can include a paper jam error, a door open error, a stapling error, a collation error, a low toner cartridge, an out of paper error, a control component failure and a power component failure. Error response data can include a user or other party's response to the error data. Such response can occur as a result of a clearance strategy displayed to a user. Error response data can refer to performing a step, replacing a component, repairing a component, updating software, updating firmware, contacting technical personnel, and searching the web. A successful response can be referred to as a solution. Similarly, an unsuccessful response can be associated with an error condition that is not eliminated as a result of the response to the error.

In one example, error data indicates that a toner cartridge in a printing platform is low. One error response can be opening the appropriate door on the printing platform to access the toner cartridge, removing the toner cartridge and replacing the toner cartridge with a new cartridge or fill the toner cartridge with more toner. Success of this response can be determined based at least in part upon the elimination of the error condition that results from the response. In another example, success can be indicated when the error condition does not reoccur in successive operations. For instance, replacing the toner cartridge may solve the current problem, but does not address the root cause of the error, which may be a faulty toner delivery system.

A successful or unsuccessful response can be determined based on substantially any number of metrics associated with the functionality, operability, etc. of the platform, machine or other device responsive to the error condition. In one example, a successful result is one that partially or substantially eliminates the error condition. In another example, an unsuccessful result is one that does not wholly eliminate the error condition.

By logging error data, response to the error data and/or gauging the success associated with the response to the error data, the storage component 14 can act as a device that can learn from each error situation and provide discriminating behavior by self-training over time. For example, the storage component 14 can determine the appropriate response to successfully eliminate an error condition. In one aspect, the appropriate response to an error condition can be determined by machine learning wherein one or more training sets of data with examples of desired results and/or undesired results for data format and/or processing techniques can be utilized to train the system. In another aspect, initial conditions, based on one or more features that indicate desired results, can be utilized. Such initial conditions can be refined overtime and in response to user actions associated with returned results in order to improve discrimination.

The presentation component 16 can display a clearance strategy received from the linking component 10 to provide a solution to one or more error conditions. The clearance strategy can be displayed utilizing any number of graphs, charts, tables, graphics, diagrams, text, etc. In some instance, the presentation component 16 can also provide audible and/or non-visual information to communicate such help information to a user. In addition, the presentation component 16 can accept data from the linking component utilizing substantially any format, standard and/or protocol.

The presentation component 16 can be any suitable hardware and/or software device that can display help information. In one example, the presentation component 16 is a monitor, a cathode ray tube (CRT), a touch screen, a light emitting diode (LED) display, a liquid crystal display (LCD), a flat panel monitor, a plasma display, etc. that displays information. In another example, the presentation component 16 is an auditory alarm that conveys information in an audio manner. The presentation component 16 can employ a variety of color schemes, graphical displays, etc. to quantify and display the clearance strategy.

The presentation component 16 can display one or more clearance strategies in any suitable format to provide information that can be easily employed by one or more users. For instance, if the presentation component 16 is employed with a machine, a help screen may contain a diagram of the machine. Animation or other means can be employed to illustrate actions to be taken by the user. For example, the machine diagram can intermittently flash an area where action needs to be taken to solve the error condition. Once a particular action is taken, the help screen may change to provide further help. In one approach, a view includes a menu with submenus that provide a more detailed view of a particular area of a machine. In addition, directions can be placed on the presentation component 16 that relate to one or more aspects of the machine. Alternatively or in addition, video and/or other display media can be employed to illustrate actions to solve an error condition.

In another embodiment, the presentation component 16 can also serve as a web browser to allow a user to locate help information from one or more websites. Such web browser can provide a search engine, favorite websites, and/or access to a knowledge base that provides known solutions to one or more errors. The knowledge base can contain an organized, searchable database of solutions that have been accumulated from one or more sources. In this manner, solutions employed by one or more disparate parties can be leveraged to provide the most appropriate solution for a given error condition.

The machine control component 18 can be utilized to interface to a machine, a platform or other device that displays help information via the presentation component 16. The machine control component 18 can represent one or more input and/or output devices such as a pushbutton, a switch, a touch screen, a dial, a microphone, a slider, a gauge, etc. that can be utilized by a user to interact with the platform, machine or other device. In one example, the user follows help instructions displayed by the presentation component 16 to interact with the machine via the machine control component 18. In another example, the machine control component 18 is the presentation component 16. In this manner, a user can respond via the machine control component 18 to a clearance strategy displayed on the presentation component 16.

Figure 2:
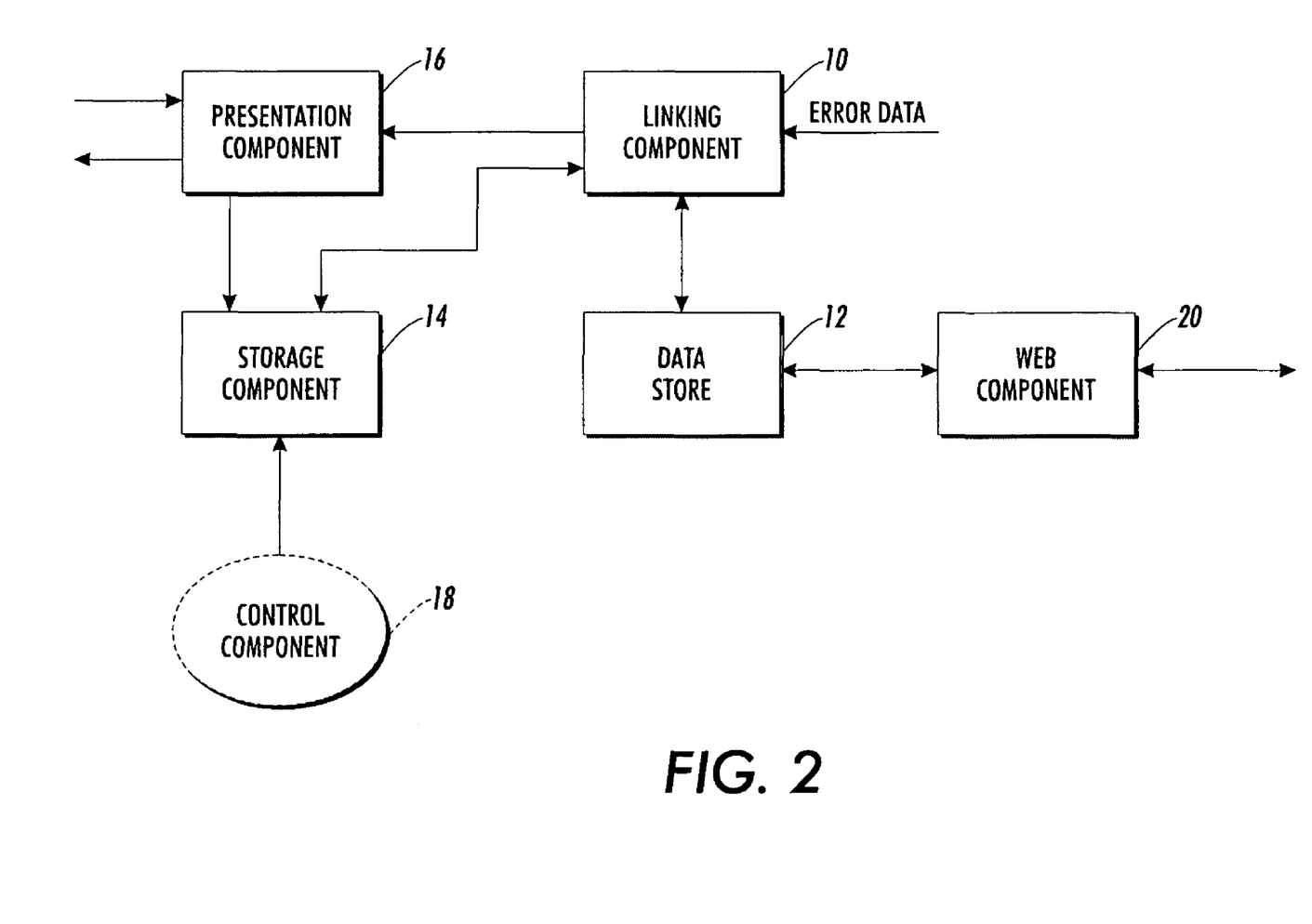
FIG. 2 illustrates the system of FIG. 1 further including a web component to facilitate communication with one or more remote resources to locate one or more clearance strategies.

Referring now to FIG. 2, the system additionally or alternatively includes a web component 20. The web component 20 interfaces with at least one of an intranet, an internet, the Internet and/or any other network. The data store 12 can receive updates and/or other information from the web component 20. Such information can be employed to provide updated help information within the data store 12.

In one example, the web component 20 receives data from one or more sources on a periodic basis, for instance, when a particular condition is met, when initiated by a user, etc. The web component 20 can receive data that can be associated with one or more clearance strategies. For example, the web component can receive information that may solve a portion of a plurality of disparate error conditions. This information can be recognized and associated with clearance strategies that solve the plurality of error conditions.

In another example, the user, via the presentation component 16, initiates web access by activating a designated control. In one example, the presentation component 16 displays a screen employed with a computer operating system. Web access can be activated by instantiating web browsing software associated with the computer operating system. Once activated, the user can employ a mouse or other peripheral device to navigate to one or more websites via hyperlinks, uniform resource locator (url) addresses, search engines, etc. within the web browsing software. Once desired content is located and identified, the user can designate such information as associated with one or more clearance strategies, as desired.

The web component 20 can utilize one or more internet applications and/or protocols such as Java, extensible markup language (XML), hypertext markup language (HTML), simple mail transfer protocol (STMP), etc. to provide streaming, downloading, and/or uploading of data. In one example, help information is accessed from a remote location via the web component 20 and streamed to the presentation component 16 upon request. In another example, a document (e.g., user manual, white paper, etc.) is downloaded and earmarked to address one or more error conditions. For instance, a white paper related to power supply failures within a multifunction printing platform can be employed to provide a user with one or more clearance strategies.

Figure 3:
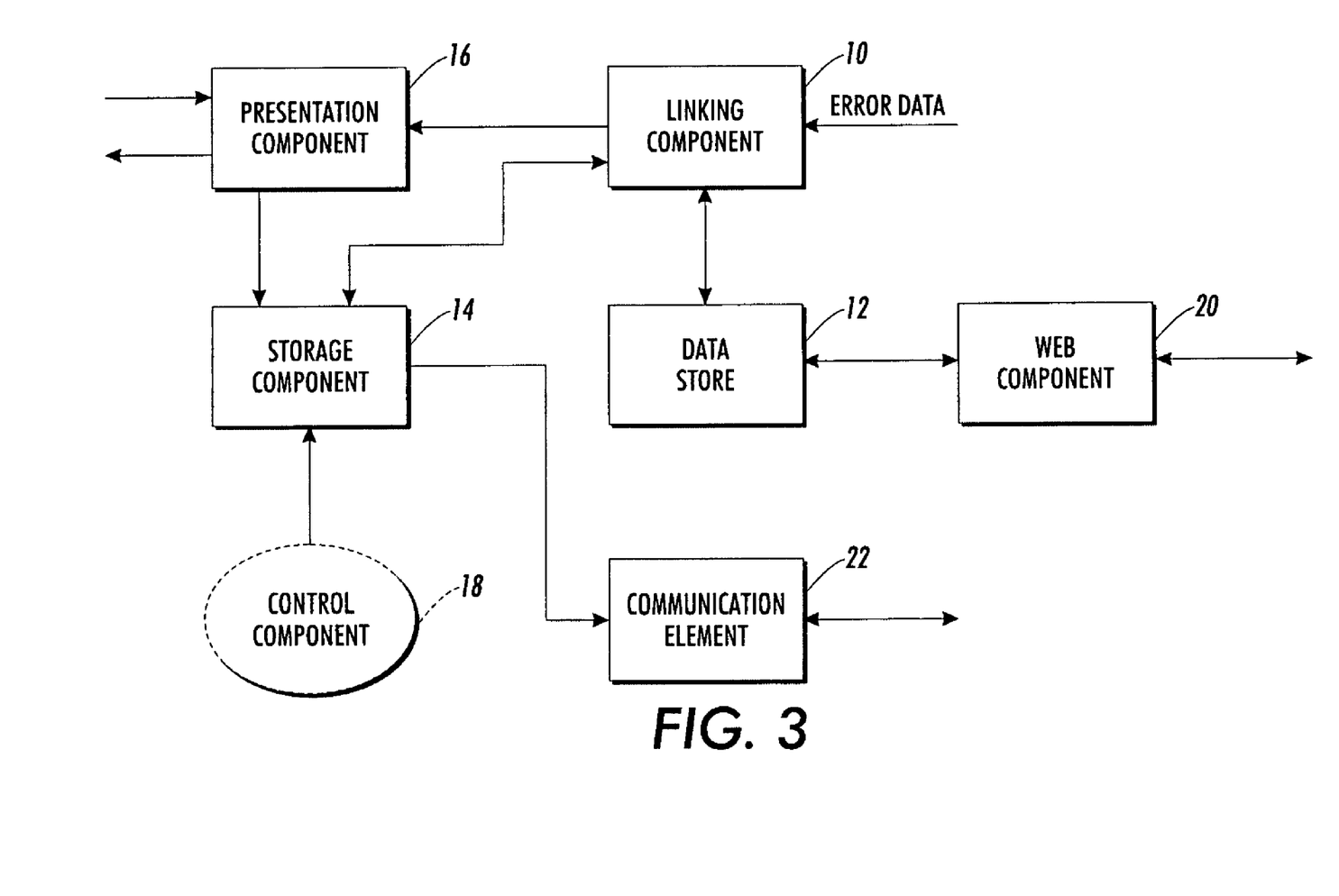
FIG. 3 illustrates the system of FIG. 2 further including a communication element to transmit success and unsuccessful error responses to one or more recipients.

Referring now to FIG. 3, the system additionally or alternatively includes a communication element 22, which transmits information received from the storage component 14 to one or more recipients. In one example, the communication element 22 provides error data, error response data and data indicative of whether such response was successful or unsuccessful to a remote database (e.g., knowledge base, central database, etc.). By accumulating learned behavior to a central location (not shown), an overall system benefit can be realized. Thus, responses to error conditions that are successful can be employed again and responses that are unsuccessful can be tagged as such and/or discarded.

In one example, the central database is coupled to a plurality of machines that employ the dynamic help system wherein each of these machines can provide up-to-date help information to each machine user. The communication element 22 can communicate utilizing substantially any protocol such as Ethernet, Wi-Fi, TCP/IP, SMTP, MPLS, etc. Additionally, the communication element 22 can communicate utilizing any suitable media such as wire, radio, wireless, fiber optic and the like.

The communication element 22 can also be employed to automatically order components that have failed. In one example, a particular control component ceases to operate properly. In this case, the linking component 10 can initiate a command to the communication element to communicate with one or more remote components and transmit a request for one or more components.

In addition, the order placed can generate an address to which to send the components and a form of payment (e.g., purchase order number, account number, etc.). In one approach, the location of the device is associated with a particular IP and/or MAC address within a network. In another approach, the location of the device is related to the location of a platform, machine, or other device associated therewith. Such location can be established by a communication with one or more remote devices, such as a manufacturer's database, for example.

Moreover, the communication element 22 can automatically order components to provide preventative maintenance to insure that a machine, platform or other device maintains a maximum amount of uptime. In this non limiting approach, one or more disposable and/or replaceable components can be identified based at least in part upon system configuration, etc. and monitored as they are utilized. For instance a toner cartridge, drum, or other wear item can be monitored to determine the amount of time until a particular component will fail. In addition, predetermined thresholds can be designated and associated with each of the components such that these devices are ordered when a particular condition is met. In one example, a new toner cartridge is ordered when a toner cartridge has thirty percent toner remaining.

The communication element 20 can contact one or more help resources such as technical personnel, help desks, service centers, and the like. In one approach, the linking component 10 determines that there is no clearance strategy associated with received error data. The linking component 10 can initiate contact with one or more help resources and provide the nature of the error condition identified. Further, contact information such as a telephone number, an address, an email address, an instant messaging address, a cell phone number, a pager number, etc. can be provided with the help request to facilitate communication with the user.

Figure 4:
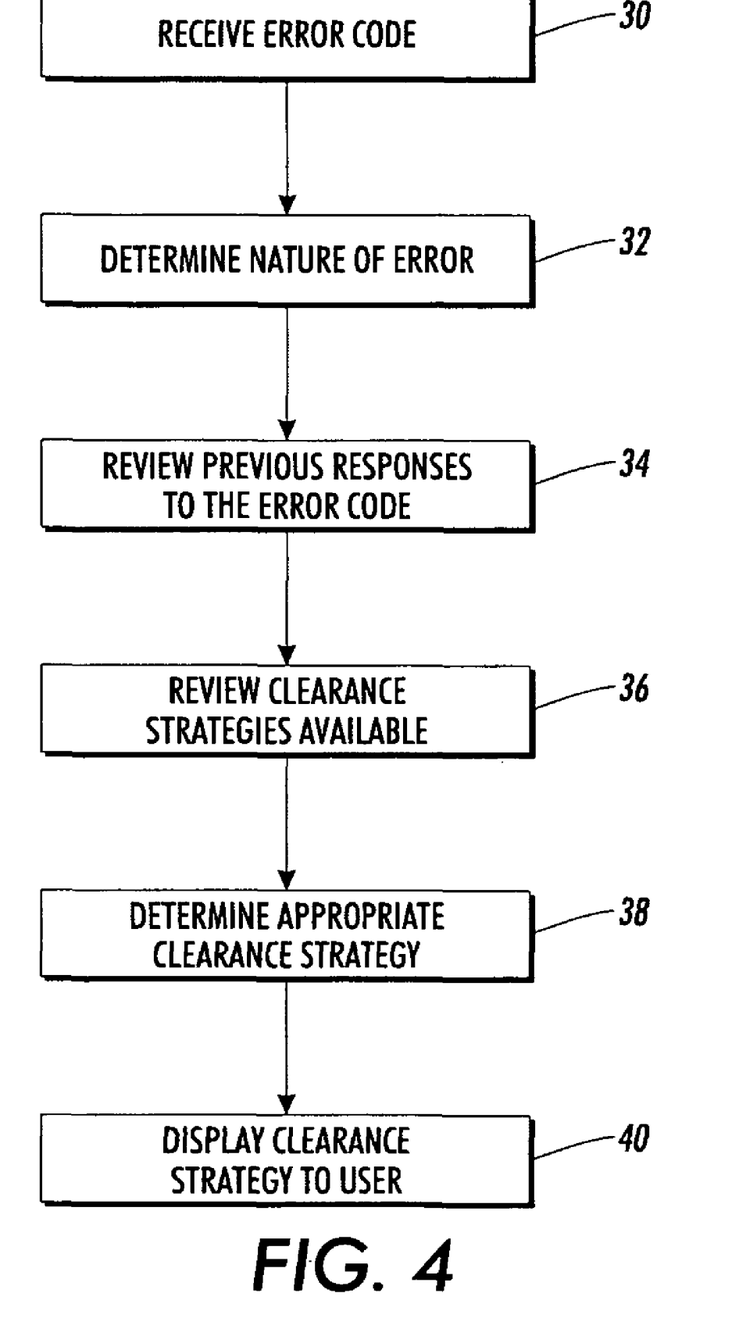
FIG. 4 illustrates a method of displaying a clearance strategy to a user.
Figure 5:
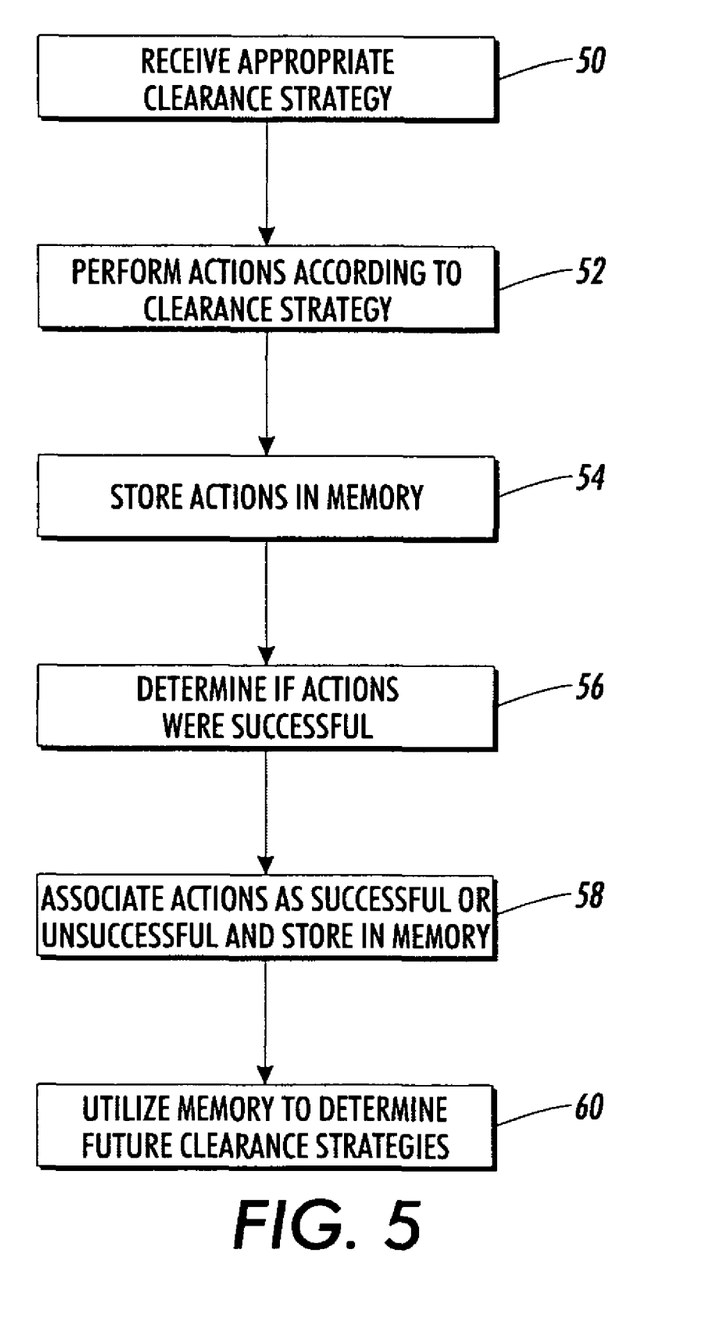
FIG. 5 illustrates a method of utilizing past actions stored in memory to determine future clearance strategies.
Figure 6:
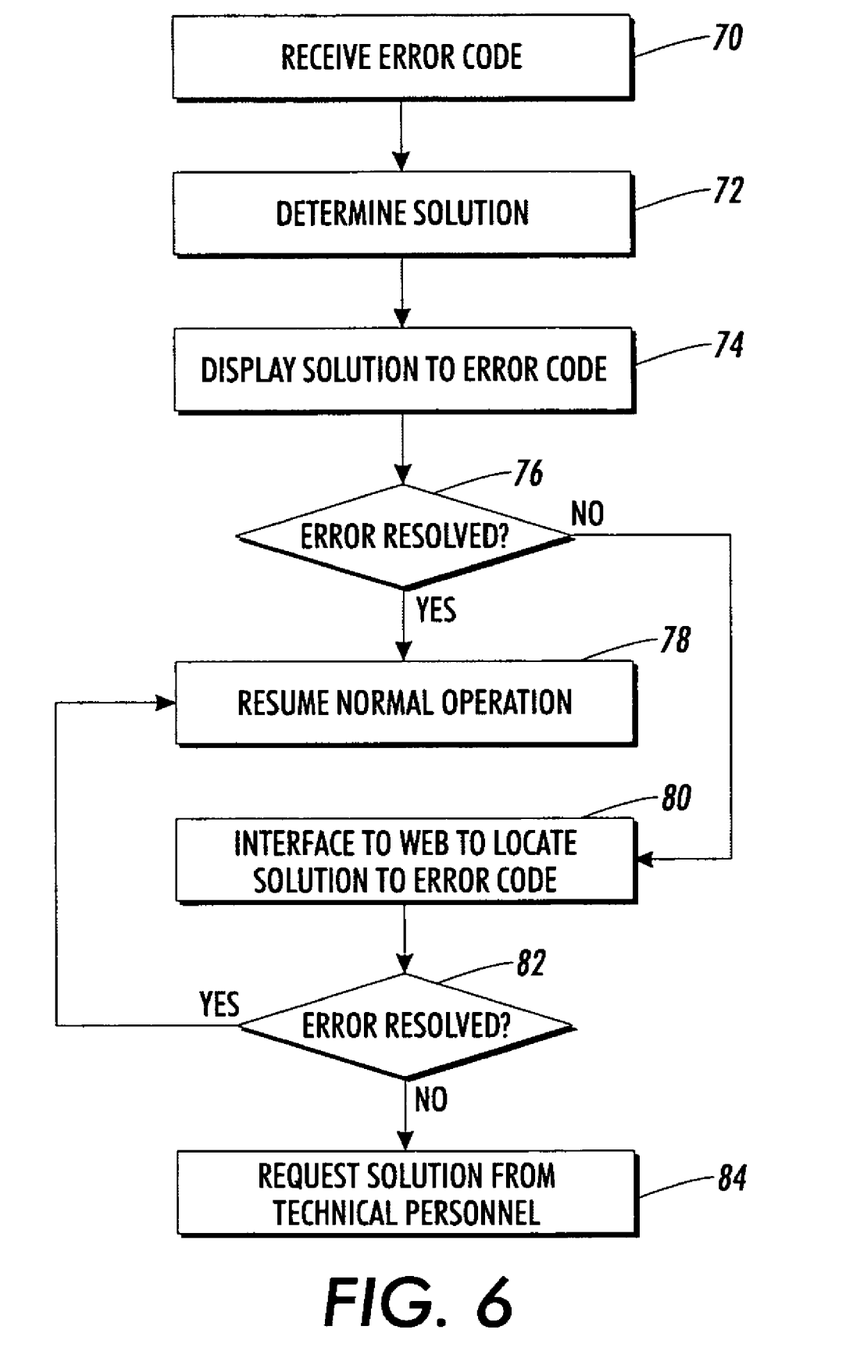
FIG. 6 illustrates a method to resolve an error by interfacing to the web and/or requesting a solution from technical personnel.

While, for purposes of simplicity of explanation, the methodologies of FIGS. 4, 5 and 6 are shown and described as executing serially, it is to be understood and appreciated that the present embodiments are not limited by the illustrated order, as some aspects could, in accordance with the present embodiments, occur in different orders and/or concurrently with other aspects from that shown and described herein. Moreover, not all illustrated features may be required to implement a methodology in accordance with an aspect of the present embodiments.

FIG. 4 illustrates a methodology that displays a clearance strategy to a user that addresses one or more error conditions. At reference numeral 30, an error code is received. Such error code can be representative of one or more error conditions associated with a system, network, machine or other device. In one approach, the error code is an alphanumeric string wherein particular characters are associated with particular locations, error conditions, replacement components, etc.

At 32, the nature of the error is determined. In one example, the error code is analyzed to determine the error condition associated therewith. In another example, the nature of the error is determined based upon the type of signal received. For instance, if an analog signal is outside a predetermined threshold, an error condition can be indicated. Similarly, if a digital signal is received from a particular device (e.g., switch, control component, etc.), an error condition can be indicated. It is to be appreciated that the signal can be an electrical, optical, mechanical, etc. signal. Furthermore, if a signal is received by a particular input terminal, the nature of the error can be determined. For example, if a signal is received from a digital switch at a known location by a particular input terminal, such input can indicate an error condition exists.

At reference numeral 34, previous responses to the error code are reviewed. For instance, responses are scrutinized to determine any previous responses that have been successful with regard to the error condition identified. In one example, removing paper from a particular location is a successful clearance strategy (e.g., solution) for a paper jam in the particular location. In another example, a series of actions to reset a roller in a printing platform is an appropriate clearance strategy. At 36, available clearance strategies are reviewed. Clearance strategies can be associated with one or more configurations wherein each configuration relates to a particular machine model, style, make, etc. wherein disparate designs and components are utilized. In one example, a clearance strategy associated with one machine may not be appropriate for another machine.

Based at least upon the previous responses and available clearance strategies, at 38, the appropriate clearance strategy is determined. Such determination can be made based on one or more response metrics. In one non limiting approach, responses can be ranked based on at least one of effectiveness, applicability, feasibility, frequency of past use, etc. At 40, the clearance strategy selected at reference numeral 38 is displayed to a user. Such display can be accomplished utilizing one or more display devices such as a monitor, LEDs, etc. and presented utilizing graphics, graphs, charts, alphanumeric text, etc.

Referring now to FIG. 5, which illustrates a methodology to utilize memory to determine future clearance strategies. At 50, an appropriate clearance strategy is received by one or more control components, such as a linking component, for example. Clearance strategies can be provided to respond to one or more error conditions. At 52, actions are performed according to the clearance strategy received. In one example, a user reads instructions that describe the clearance strategy on a presentation component or other display device within a machine. The user can interface with the machine utilizing input devices such as switches, pushbuttons, touch screens, and any number of mechanical devices.

At 54, the performed actions are stored in memory. In one embodiment, a central processing component records the actions performed by one or more users. In addition, the central processing component can correlate actions related to a particular clearance strategy (e.g., actions taken to respond to a clearance strategy presented to a user). At 56, a determination is made as to whether the actions were successful. Success can be quantified in many ways including whether or not the error condition related to the clearance strategy was eliminated. In another non limiting example, success can be measured by the level of mitigating the error condition. At 58, the one or more actions are classified as either successful or unsuccessful. Such actions and the associated success or failure classification are stored in memory for subsequent retrieval. At 60, the memory is utilized to determine future clearance strategies.

FIG. 6 illustrates a methodology to resolve an error. Such error can be associated with a machine or other device. At 70, an error code is received. The error code can indicate the nature of one or more error conditions. Such indication can be expressed by particular alphanumeric characters and/or codes correlated to particular error conditions. At 72, a solution (e.g., clearance strategy) is determined to resolve the error condition represented by the error code. The solution can be determined by any number of desired criteria such as the elimination or mitigation of an error condition, a likelihood the error condition will cease, etc. At 74, the solution to resolve the error code is displayed via a presentation component or similar means. At 76, after performing the solution, a determination is made whether the error condition is resolved. Resolution can include elimination or mitigation of the error condition. At 78, if the error condition is resolved, normal operation of the machine or other device is resumed.

If the error is not resolved, at 80, a search is conducted via the web to locate a solution to the error code. Such a search can include one or more websites, knowledge bases, remote databases, etc. In this manner, solutions culled from a plurality of disparate sources can be searched in order to find an appropriate solution to the error code. At 82, a determination is made whether the error condition has been resolved by the solution located via the web. If the error has been resolved, at 78, normal operation of the machine or other device is resumed. At 84, if the error condition is still not resolved, a request is sent to technical personnel, and, in some instance, the user can override the error condition (e.g., where one paper tray is malfunctioning but another is available to print jobs). Such a request can be performed automatically upon an unsuccessful attempt to resolve the error condition associated with the error code. Alternatively or in addition, a manual request can be performed to request a solution to one or more error conditions represented by one or more error codes.

It will be appreciated that variations of the above-disclosed and other features and functions, or alternatives thereof, may be desirably combined into many other different systems or applications. Various and variant embodiments presently unforeseen or unanticipated alternatives, modifications, variations or improvements therein may be subsequently made by those skilled in the art which are also intended to be encompassed by the following claims. In addition, the claims can encompass embodiments in hardware, software, or a combination thereof.

The invention claimed is:

1. A diagnostic system that provides help to a user, comprising:
    a data store that stores one or more solutions to at least one error, wherein each solution associated with an error has a success rate, which is employed to organize each solution based on likelihood of success in eliminating the error;
    a storage component that logs error data and associates errors, responses to the errors, information indicative of whether each of the error responses was successful or unsuccessful, and is configured to determine an appropriate response to eliminate an error by machine learning;
    a web component that receives updated solution information from one or more sources on a periodic basis and provides said data store with said updated information;
    a linking component that receives the error data from a source and identifies an appropriate solution to the error data from the information logged in the storage component;
    a presentation component that presents the appropriate solution to a user; and
    a central processing component that records actions performed and correlates said actions to a particular clearance strategy.

2. The diagnostic system according to claim 1, wherein the linking component identifies the appropriate solution to the error data from the information stored in the data store.

3. The diagnostic system according to claim 1, wherein the web component is a web portal for searching and locating updated solution information from one or more websites.

4. The diagnostic system according to claim 1, wherein the system is employed in a multifunction printing platform.

5. The diagnostic system according to claim 1, further including:
a communication element that transmits at least one of the error data, the error response data, and whether the error response was successful or unsuccessful from the storage component to a remote component.

6. The diagnostic system according to claim 5, further including a component that automatically submits an order for a replacement component if the error condition indicates that a component is defective.

7. The diagnostic system according to claim 6, wherein the component notifies one or more technicians in response to at least one of user feedback, type of error condition and error code received.

8. The diagnostic system according to claim 5, wherein the remote component is a searchable database.

9. The diagnostic system according to claim 1, wherein error response data includes user actions that are responsive to the error data received by the linking component.

10. The diagnostic system according to claim 1, wherein the error information received is an error code that represents a particular error or warning condition.

11. The diagnostic system according to claim 1, wherein the error information relates to at least one of a paper jam error, a door open error, a stapling error, a collation error, a low toner cartridge, an out of paper error, a control component failure, and a power component failure.

12. The diagnostic system according to claim 1, wherein the solution is at least one of performing a step, replacing a component, repairing a component, updating software, updating firmware, contacting technical personnel, and searching the web.

13. A method that provides help to a user, comprising:
providing a diagnostic system capable of:
receiving an error code;
determining the error from the error code;
reviewing previous responses to the error code stored in a data store;
reviewing available clearance strategies for the error, wherein said clearance strategies and associated error have a success rate, which is employed to organize each clearance strategy based on the likelihood of success in eliminating the error;
determining the appropriate clearance strategy by machine learning;
displaying the clearance strategy to the user;
performing said clearance strategy;
determining whether said clearance strategy was successful;
storing the actions of the user in response to the displayed clearance strategy in memory and correlating said actions to a particular clearance strategy; and
providing a web component that receives updated data on a periodic basis and updates clearance strategies in said data store.

14. The method according to claim 13, wherein the displayed clearance strategy is performed by a user to resolve the error.

15. The method according to claim 13, further including:
utilizing the stored actions to determine future clearance strategies.

16. A method for remedying a machine error condition using a diagnostic system, comprising:
receiving an error code into said diagnostic system from the machine, which is representative of an error condition;
determining a first solution to respond to the error code by linking the error code to one or more solutions stored in a data store, wherein each solution is associated with an error and has a success rate, which is employed to organize each solution based on the likelihood of success in eliminating the error;
displaying the first solution to a user via a user interface on said diagnostic system;
determining if the first solution resolved the error condition;
interfacing to a network to search various sources and locate a second solution if the error was not resolved utilizing the first solution;
determining if the second solution resolved the error condition;
requesting additional solutions from at least one resource until the error is resolved, wherein said network receives updated data on a periodic basis and updates solutions in said data store.

17. The method according to claim 16, wherein the first solution is further determined by selecting the solution with the highest success rate from the one or more solutions.

18. The method according to claim 16, wherein interfacing to a network includes searching at least one of a web-enabled searchable database, a knowledge base, and a web page.

* * * * *